(12) United States Patent
Kisaka et al.

(10) Patent No.: US 6,747,832 B2
(45) Date of Patent: Jun. 8, 2004

(54) DISK APPARATUS AND HEAD POSITION CONTROL METHOD

(75) Inventors: Masashi Kisaka, Yokohama (JP); Yutaka Ozawa, Fujisawa (JP); Kenji Toga, Fujisawa (JP)

(73) Assignee: Hitachi Global Storage Technologies Netherlands, B.V. (NL)

( * ) Notice: Subject to any disclaimer, the term of this patent is extended or adjusted under 35 U.S.C. 154(b) by 458 days.

(21) Appl. No.: 09/819,154

(22) Filed: Mar. 27, 2001

(65) Prior Publication Data

US 2002/0141097 A1 Oct. 3, 2002

(30) Foreign Application Priority Data

Mar. 30, 2000 (JP) ........................................ 2000-093351

(51) Int. Cl.$^7$ ............................................... G11B 15/46
(52) U.S. Cl. ................. 360/73.03; 360/78.11; 360/78.14
(58) Field of Search ........................ 360/78.011, 73.03, 360/75, 78.14, 78.01, 77.03

(56) References Cited

U.S. PATENT DOCUMENTS 5,493,670 A * 2/1996 Douglis et al. ............. 713/324
5,801,894 A * 9/1998 Boutaghou et al. ........ 360/72.1

* cited by examiner

Primary Examiner—David Hudspeth
Assistant Examiner—K. Wong
(74) Attorney, Agent, or Firm—Robert B. Martin; Bracewell & Patterson, L.L.P.

(57) ABSTRACT

A disk drive has a data recording medium such as a disk, a spindle motor for rotating the disk, disk rotation speed controlling logics for supplying a spindle current to the above described spindle motor to rotate the disk at a constant speed, a head unit for accessing the disk, an actuator for moving the head unit, and head position controlling logics for driving the actuator and controlling the position of the head unit. The head position controlling logic obtains the value of the spindle current and controls the position of the head unit on the basis of the above described spindle current value by using the fact that the spindle current varies according to variations in the position of the head unit.

6 Claims, 7 Drawing Sheets

DISK APPARATUS AND HEAD POSITION CONTROL METHOD

BACKGROUND OF THE INVENTION

1. Technical Field

The present invention relates to a disk apparatus such as a hard disk drive and a head position control method for controlling the position of the head unit that writes data to the disk and/or reads data from the disk. In particular, the present invention relates to a disk drive apparatus and a head position control method that control the position of the head unit on the basis of the spindle current supplied to the spindle motor that rotates the disk.

2. Description of the Related Art

A disk apparatus includes: a disk, which is a data recording medium; a spindle motor for rotating the above described disk; disk rotation speed controlling means for supplying a spindle current to the above described spindle motor to rotate the above described disk at a constant speed; a head unit for accessing the above described disk; an actuator for moving the above described head unit; head position controlling means for driving the above described actuator and controlling the position of the above described head unit; and position detection data generating means for generating position detection data for the above described head unit from servo information that the above described head unit reads from the above described disk, and the disk apparatus reads, by means of the head unit, servo information written to the disk beforehand, generates position detection data for the head unit from this servo information by means of position detection data generating means, drives the actuator and controls the position of the head unit by means of the head position controlling means on the basis of this position detection data, and accesses a target cylinder (track) on the disk by means of the head unit.

In addition to a mode for controlling the position of the head unit on the basis of the above described position detection data (called "active mode" in the following descriptions), the above described disk apparatus and especially a small disk apparatus has power-save modes for reducing power consumption. There are a plurality of power-save modes that differ according to whether or not the head unit is retracted from above the disk, whether or not disk rotation is halted, and so forth. Among these power-save modes, one for which the time until return to the active mode is short is a power-save mode in which the power supply of the position detection data generating means is turned OFF while leaving the head unit positioned above the rotating disk. This power-save mode is called "initial power-save mode" in the following descriptions.

FIG. 7 shows structural drawings of the interior of the enclosure of disk apparatuses. Here, A is an old type, and B is a new type in which the enclosure has been made smaller. In FIG. 7, reference numeral 1 denotes the disk, reference numeral 2 denotes the spindle motor, reference numeral 3 denotes the head unit, reference numeral 4 denotes the actuator, configured by a voice coil motor (VCM) 41, and a head arm 42 at the tip of which the head unit 3 is mounted, reference numeral 5 denotes a ramp that supports the head arm 42 when the head unit 3 is retracted (unloaded) (more precisely, the head arm 42 moves up a first inclined face of the ramp 5, moves down a second inclined face consecutive to this first inclined face, and is supported by a supporting surface consecutive to this second inclined face), reference numerals 10A and 10B denote the enclosure, reference numeral 11 denotes an inner crash stop that controls the rotation range in an anticlockwise direction (toward the center of the disk) of the head arm 42, and reference numerals 12A and 12B denote a flexible printed cable (FPC) that connects the VCM 41 and the head unit 3 to a control board (not shown) on which the position detection data generating means and head position controlling means are installed. FIG. 7 is a structural drawing showing the head unit 3 unloaded; in the above described active mode and initial power-save mode, the head arm 42 rotates anticlockwise and is detached from the ramp 5, and the head unit 3 is loaded into the air above the rotating disk 1.

In the above described initial power-save mode, position detection data is no longer generated, and therefore the position of the head unit 3 must be controlled, and the head unit 3 positioned at the prescribed position on the disk 1, by a head position controlling means that does not use position detection data. If the head position is not controlled in the initial power-save mode, the head arm 42 may move toward the outer edge of the disk and remain lodged against the first inclined face without being supported by the ramp 5, or move toward the center of the disk and remain lodged against the inner crash stop 11, and in the worst case, the head unit 3 may touch the disk 1 and crash.

In the conventional disk apparatus of FIG. 7A, using the fact that the bias force received by the actuator 4 from the FPC 12A varies according to variations in the position of the head unit 3, in the active mode a VCM current is found beforehand that generates torque that balances the above described bias force at the target position, and in the initial power-save mode, the head unit 3 is positioned at the above described target position by supplying the above described VCM current to the VCM 41.

However, in reducing the size of the disk enclosure and implementing higher density inside the disk enclosure, as in the change from the disk enclosure 10A in FIG. 7A to the disk enclosure 10B in FIG. 7B, in order to achieve further reduction in the size of a disk apparatus, the routing of the FPC is unavoidably changed from the kind illustrated by the FPC 12A in FIG. 7A to the kind illustrated by the FPC 12B in FIG. 7B, and due to this change in the FPC routing, the variation in the bias force from the FPC with respect to the head position is decreased, making it difficult to balance the above described bias force and the torque produced by the VCM, and to fix the head unit at a prescribed position.

FIG. 8 presents graphs showing the bias force received by the actuator from the FPC (the VCM current that generates torque for balancing this bias force) with respect to the position of the head unit in the disk apparatuses in FIG. 7. Here, A shows the case of the old type of disk apparatus in FIG. 7A, and B shows the case of the new type of disk apparatus in FIG. 7B. The above described bias force (VCM current that generates torque balancing this) is different for the case where the head arm 42 is rotated away from the outer edge of the disk and toward the center of the disk, and the case where, conversely, the head arm 42 is rotated away from the center of the disk and toward the outer edge of the disk (that is to say, there is hysteresis according to the direction of rotation of the head arm 42). In FIG. 8, the characteristic shown by the solid line is for the case of rotation away from the outer edge of the disk and toward the center of the disk, and the characteristic shown by the dotted line is for the case of rotation away from the center of the disk and toward the outer edge of the disk.

As shown in FIG. 8A, in the old type of disk apparatus in FIG. 7A the slope of the characteristic of variation of the bias force from the FPC 12A with respect to the head position is large, and therefore the position of the head unit 3 (the position of the head arm 42) does not differ greatly from the target position even if the VCM current that generates torque balancing the bias force at the target position is somewhat adrift. However, as shown in FIG. 8B, in the new, smaller type of disk apparatus in FIG. 7B, the slope of the characteristic of variation of the bias force from the FPC 12B with respect to the head position is small, and therefore it is difficult to achieve a balance between the bias force and the VCM torque at the target position (the margin for achieving the above described balance is smaller than in the old type). In the area from midway across the disk to the outer edge (the area from 21 to 30 mm from the center of the disk), especially, the above described characteristic slope is small and the margin for preventing the head arm 42 from moving and lodging against the ramp 5 is small.

The present invention solves the above described conventional problems, and has as its object the provision of a disk apparatus and head position control method that enable the head unit to be controlled at a prescribed target position even if head unit position detection data cannot be obtained by means of servo information read from the disk by the head unit, and enable a reduction in size of the disk apparatus to be achieved.

SUMMARY OF THE INVENTION

The disk apparatus of the present invention for achieving the above described objective includes: a disk, which is a data recording medium; a spindle motor for rotating the above described disk; disk rotation speed controlling means for supplying a spindle current to the above described spindle motor to rotate the above described disk at a constant speed; a head unit for accessing the above described disk; an actuator for moving the above described head unit; and head position controlling means for driving the above described actuator and controlling the position of the above described head unit, in which the above described head position controlling means obtains the value of the above described spindle current, and, controls the position of the head unit on the basis of the above described spindle current value by using the fact that the above described spindle current varies according to variations in the position of the above described head unit.

Also, the head position control method of the present invention in which a disk apparatus includes: a disk, which is a data recording medium; a spindle motor for rotating the above described disk; disk rotation speed controlling means for supplying a spindle current to the above described spindle motor to rotate the above described disk at a constant speed; a head unit for accessing the above described disk; and an actuator for moving the above described head unit, and controls the position of the above described head unit by using the fact that the value of the above described spindle current varies according to variations in the position of the above described head unit, comprising the steps of:

a. obtaining the value of the spindle current;

b. finding the difference of the above described spindle current value from the target current value; and c. driving the actuator according to the above described difference.

As described above, according to the present invention, by obtaining the spindle current value, and, by using the fact that the spindle current varies according to variations in the position of the head unit, controlling the position of the head unit on the basis of the above described spindle current value, advantages are provided in that the position of the head unit can be adjusted to a prescribed target position even though head unit position detection data cannot be obtained, and the disk apparatus can be made smaller.

DETAILED DESCRIPTION OF THE PREFERRED EMBODIMENT

Figure 1:
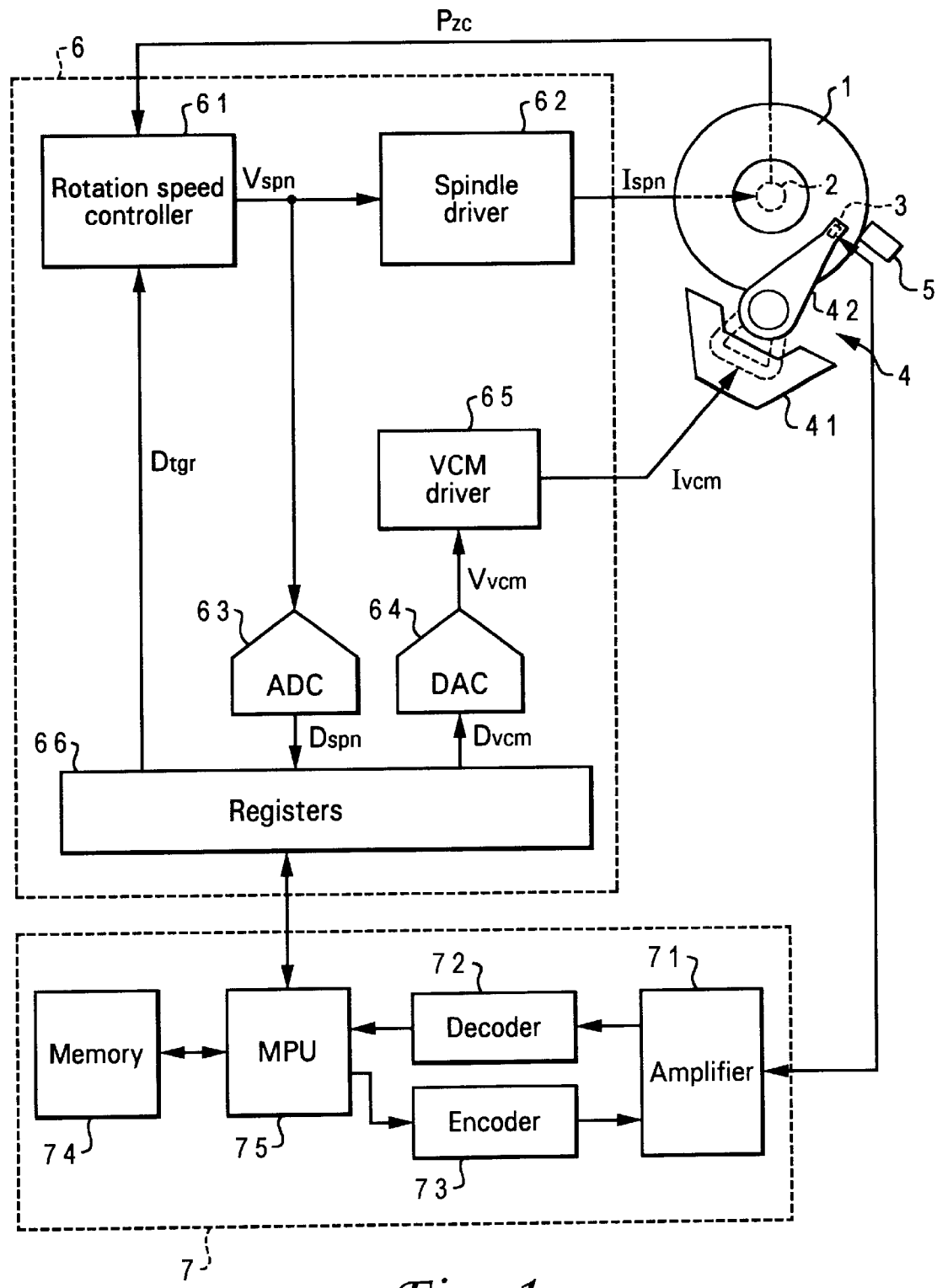
FIG. 1 is a configuration drawing of a disk apparatus according to an embodiment of the present invention.

FIG. 1 is a configuration drawing of a disk apparatus according to an embodiment of the present invention. The disk apparatus in FIG. 1 comprises a disk 1, a spindle motor 2, a head unit 3, an actuator 4, a ramp 5, a motor driver unit 6, and a control unit 7.

Figure 2:
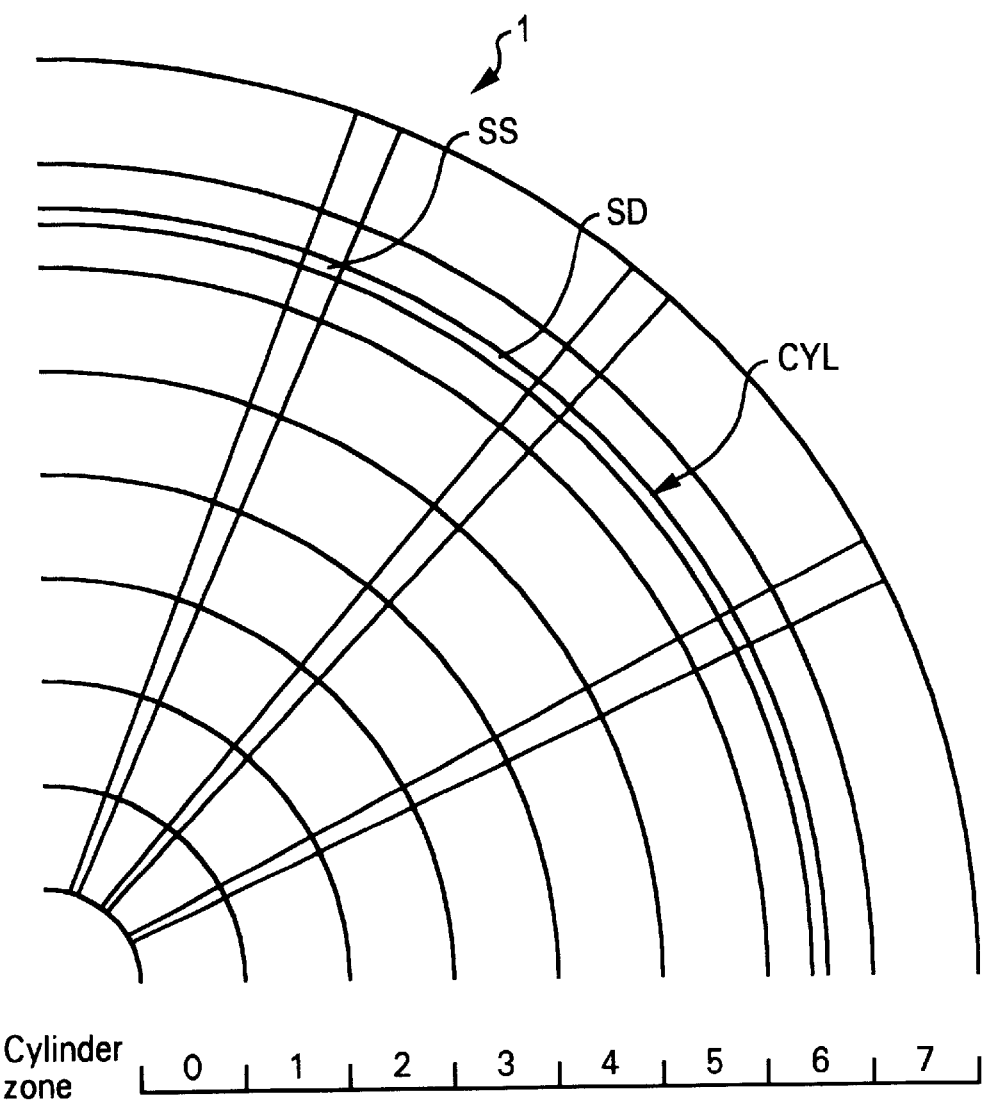
FIG. 2 is a disk surface configuration drawing.

FIG. 2 is a surface configuration drawing of the disk 1. As shown in FIG. 2, the disk 1 is divided into a large number of concentric cylinders (tracks) CYL. Each cylinder is assigned a cylinder identification ID. Each cylinder is divided into data sectors SD in which user data is recorded, and servo sectors SS in which servo information is recorded in advance. The above described servo information is information for detecting the position of the head unit 3 across the width of the disk and in the circumferential direction. The above described cylinder identification ID is included in the servo information.

The area in which disk 1 cylinders are located is configured by a plurality of cylinder zones, and each cylinder belongs to one of the cylinder zones. In FIG. 2, the disk 1 cylinder location area is configured by 8 cylinder zones: zone 0, 1, . . . , 7. The width of each cylinder zone is, for example, 2 mm.

The spindle motor 2 performs rotational driving of the disk 1 by means of a current $I_{spn}$ supplied from the spindle driver 62 of the motor driver unit 6. This spindle motor 2 is what is called a sensor-less DC motor, and has a 3-phase coil arranged in a star shape. A 3-phase alternating current $I_{spn}$ is supplied to the above described 3-phase coil, and a sequential current flows between 2 phase coils. Each time the direction of the current flowing in the above described 2 phase coils is reversed, the spindle motor 2 outputs a pulse $P_{zc}$, called a zero-cross pulse, to the rotation speed controller 61 of the motor driver unit 6.

The head unit 3 has a recording head for recording data on the disk 1, and a playback head for reading data recorded on the disk, embedded in a slider, and is mounted at the tip of the head arm 42 of the actuator 4. The actuator 4 has a voice coil motor (VCM) 41 and a head arm 42, and rotates the head arm 42, at the tip of which the head unit 3 is mounted, clockwise or anticlockwise by means of the VCM 41, moving the head unit 3.

When rotation of the disk 1 has stopped, the head arm 42 is supported by a ramp 5 located near the outer edge of the disk (more precisely, the head arm 42 moves up a first inclined face of the ramp 5, moves down a second inclined face consecutive to this first inclined face, and is supported by a supporting surface consecutive to this second inclined face), and the head unit 3 is unloaded in the retracted position. When the disk 1 is rotating at a constant speed, at the target rotation speed, the head arm 42 is rotated anticlockwise and is detached from the ramp 5, and the head unit 3 is loaded above the disk 1. The loaded head unit 3 flies above the disk 1, without touching the surface of the disk 1, due to buoyancy imparted to the above described slider by the disk 1.

The motor driver unit 6 has a rotation speed controller 61, a spindle driver 62, an A/D converter (ADC) 63, a D/A converter 64, a VCM driver 65, and a register unit 66. The rotation speed controller 61 detects the rotation speed of the spindle motor 2 by means of the pulses (zero-cross pulses) $P_{zc}$ output from the spindle motor 2 at time intervals in accordance with its rotation speed, and outputs a spindle control voltage $V_{spn}$ to the spindle driver 62 and ADC 63 so that the rotation speed of the spindle motor 2 becomes the target rotation speed $D_{tgr}$ read from the register unit 66. The spindle driver 62 supplies to the spindle motor 2 a current (spindle current) $I_{spn}$ in accordance with the input spindle control voltage $V_{spn}$, and drives the spindle motor 2.

The ADC 63 converts the input spindle control voltage $V_{spn}$ to digital data, and sets this spindle control data $D_{spn}$ in the register unit 66. The DAC 64 converts VCM control data $D_{vcm}$ to an analog voltage, and outputs this VCM control voltage $V_{vcm}$ to the VCM driver 65. The VCM driver 65 supplies to the VCM 41 a current (VCM current) $I_{vcm}$ in accordance with the input VCM control voltage $V_{vcm}$, and drives the VCM 41. The register unit 66 has a register that holds target rotation speed data $D_{tgr}$ input from an MPU 75, a register that holds spindle control data $D_{spn}$ input from the ADC 63, and a register that holds VCM control data $D_{vcm}$ input from the MPU 75.

The control unit 7 has an amplifier 71, a decoder 72, an encoder 73, a memory 74, and the MPU 75. The amplifier 71 amplifies and shapes analog signals (data sector signals and servo sector signals) read from the disk 1 by means of the playback head of the head unit 3, and outputs them to the decoder 72. In addition, the amplifier 71 amplifies and shapes analog write data signals input from the encoder 73, and outputs them to the recording head of the head unit 3. The decoder 72 generates position detection data indicating the position of the head unit 3 from servo information signals read by means of the head unit 3 from servo sectors of the disk 1, and outputs this position detection data to the MPU 75. In addition, the decoder 72 plays back data recorded in data sectors and outputs this playback data to the MPU 75.

The encoder 73 converts write data input from the MPU 75 (data to be written to a data sector of the disk 1) to an analog write data signal, and outputs this write data signal to the amplifier 71. The MPU 75 controls the operation of the entire disk apparatus. In the memory 74, data to be recorded on the disk 1 and data read from the disk 1 is held temporarily, and data for controlling the operation of the disk apparatus is also held.

When the disk apparatus power supply is turned ON, the MPU 75 sets the prescribed target rotation speed data $D_{tgr}$ in the register unit 66, and rotates the disk 1 by means of the rotation speed controller 61 and the spindle driver 62. The rotation speed controller 61 reads the target rotation speed data $D_{tgr}$ from the register unit 66, and outputs a spindle control voltage $V_{spn}$ to the spindle driver 62. The spindle driver 62 supplies to the spindle motor 2 a spindle current $I_{spn}$ in accordance with the spindle control voltage $V_{spn}$, driving the spindle motor 2, and rotating the disk 1. The rotation speed controller 61 detects the rotation speed of the spindle motor 2 on the basis of zero-cross pulses Pr from the spindle motor 2, and controls the rotation speed of the spindle motor 2 by means of the spindle control voltage $V_{spn}$ so that the rotation speed of the spindle motor 2 (=rotation speed of the disk 1) becomes the target rotation speed $D_{tgr}$. The rotation speed controller 61 and spindle driver 62 configure disk rotation speed controlling means for supplying the spindle motor with the spindle current for rotating the disk 1 at a constant speed.

When the rotation speed of the disk 1 reaches the target rotation speed $D_{tgr}$, the MPU 75 sets VCM control data $D_{vcm}$ in the register unit 66, drives the VCM 41 of the actuator 4 by means of the VCM driver 65, and rotates the head arm 42 toward the center of the disk 1. As a result, the head arm 42 is detached from the ramp 5, and the head unit 3, which was unloaded in the retracted position when the power supply was OFF, is loaded into the air above the disk 1.

The MPU 75 recognizes the position of the head unit 3 by means of head unit 3 position detection data input from the decoder 72, and controls the position of the head unit 3 by generating VCM control data $D_{vcm}$ on the basis of the above described position detection data. The decoder 72 generates the above described position detection data from servo information signals read from a servo sector of the disk 1 by means of the playback head of the head unit 3, and amplified and shaped by the amplifier 71.

When a disk access (disk 1 data recording or playback) command is input from the host apparatus, the MPU 75 moves the head unit 3 to a position above the cylinder to be accessed (seeks the cylinder to be accessed) by driving the actuator 4 on the basis of the above described position detection data. Then, when the seek is completed, in the case of data recording the write data is sent to the recording head of the head unit 3 via the encoder 73 and amplifier 71, and the data is recorded in the target data sector by means of the recording head, or in the case of data playback, the data read from the target data sector by means of the playback head of the head unit 3 is played back by means of the amplifier 71 and decoder 72.

The operating mode in which the position of the head unit 3 is controlled on the basis of position detection data according to servo information read from the disk 1 by means of the head unit 3, as described above, is called the active mode in the following descriptions. This active mode is the mode used when executing disk accesses, and during operation in the active mode a disk access can be executed as soon as a disk access command is input.

As modes in which the power supply is ON, the disk apparatus has power-save modes (idle modes) for reducing power consumption, in addition to the above described active mode. When the power supply is turned ON, the disk apparatus loads the head unit 3 as described earlier and switches to the active mode. If there is no disk access for a prescribed time, or if a power-save mode execution command is input from the host apparatus, etc., the disk apparatus switches from the active mode to a power-save mode. If a disk access execution command is input from the host apparatus in a power-save mode, the disk apparatus returns to the active mode from the power-save mode, and executes the disk access. The MPU 75 controls operation in the active mode and power-save modes, and also controls operations for switching from the active mode to a power-save mode, and returning from a power-save mode to the active mode.

The disk apparatus has a plurality of different power-save modes, and, for example, switches to the above described plurality of power-save modes in stages in accordance with commands from the host apparatus, or after the elapse of a prescribed time, finally switching to the power OFF mode (in which the power supply of the disk apparatus is turned OFF by the host apparatus, or the disk apparatus turns OFF its own power supply).

The time until the disk apparatus returns to the active mode is comparatively short, and for this reason it has, for use as the initial power-save mode entered from the active mode, and therefore as the most frequently occurring power-save mode: (A) a power-save mode in which the disk 1 rotates and the head unit 3 is loaded above the disk 1 (the disk 1 being controlled so as to rotate at a constant speed, and the head unit 3 being controlled so as to be positioned at a prescribed position), and the power supplies of the amplifier 71, decoder 72, and encoder 73 are turned OFF. In this power-save mode (A), since the power supply of the decoder 72 is turned OFF, head unit 3 position detection data according to servo information is not input to the MPU 75, and the MPU 75 must control the position of the head unit 3 by means of controlling means that does not use position detection data.

Also, in addition to the above described power-save mode (A), the disk apparatus has, for example: (B) a power-save mode in which the disk 1 rotates, the head unit 3 is unloaded on the ramp 5, and the power supplies of the amplifier 71, decoder 72, encoder 73, DAC 64, and VCM driver 65 are turned OFF; and (C) a power-save mode in which the head unit 3 is unloaded on the ramp 5, rotation of the disk 1 is halted, and the power supply of the motor driver unit 6 and the power supply of the control unit, except for the MPU 75, are turned OFF.

In such a case, transitions are made sequentially from the active mode to the above described power-save modes (A), (B), and (C), and a further transition is made from the above described power-save mode (C) to the power OFF mode by the MPU 75 turning OFF its own power supply. The MPU 75 controls these mode transitions. With the above described power-save modes, the amount of reduction in power consumption increases in the order (A), (B), (C), but the length of time taken to return to the active mode also increases in the order (A), (B), (C). Also, in switching from the active mode or a power-save mode to the power OFF mode in response to a command from the host apparatus, etc., the MPU 75 first unloads the head unit 3 onto the ramp 5, and then turns off the power supply of the motor driver unit 6 and control unit 7. A special feature of the disk apparatus of the present embodiment is a power-save mode in which the head unit 3 is loaded above the rotating disk 1, as in the above described power-save mode (A).

After the elapse of a prescribed time with no disk access in the active mode, or when a power-save mode execution command is input from the host apparatus, for example, the MPU 75 switches the disk apparatus from the active mode to the above described power-save mode (A). In the above described power-save mode (A), the head unit 3 remains loaded above the rotating disk 1, while the power supplies of the amplifier 71, decoder 72, and encoder 73 are turned OFF, and it possible to return to the active mode in a short time.

As the power supplies of the amplifier 71 and decoder 72 are turned OFF in this way in the above described power-save mode (A), position detection data is no longer generated by means of read signals for servo information recorded in servo sectors, and it is not possible for the MPU 75 to control the position of the head unit 3 on the basis of head unit 3 position detection data. It is therefore necessary for the position of the head unit 3 to be controlled, and for the head unit 3 to be positioned at a prescribed position on the disk 1, by some means or other. In a conventional disk apparatus, the VCM current that balances the bias force from the flexible cable is found in advance in the active mode, and in the above described power-save mode (A), the head unit 3 is positioned at a prescribed position by supplying the above described VCM current found in advance to the VCM.

The disk apparatus of the present embodiment obtains in advance, in the active mode in which the position of the head unit 3 is controlled precisely on the basis of position control data, and holds, the value of the spindle current $I_{spn}$ at the time when the head unit 3 is positioned at the target position in a power-save mode, as the target spindle current for the power-save mode; and in the above described power-save mode (A), obtains the spindle current $I_{spn}$, and, by using the fact that the spindle current $I_{spn}$ for rotating the disk 1 at a constant speed varies according to the position of the head unit 3, positions the head unit 3 at the target position by driving the actuator so that the value of the spindle current $I_{spn}$ obtained in the above described power-save mode becomes the above described target spindle current value. That is, in the above described power-save mode (A), the disk apparatus of the present embodiment obtains the value of the spindle current $I_{spn}$, and controls the position of the head unit 3 on the basis of this spindle current value.

Figure 3:
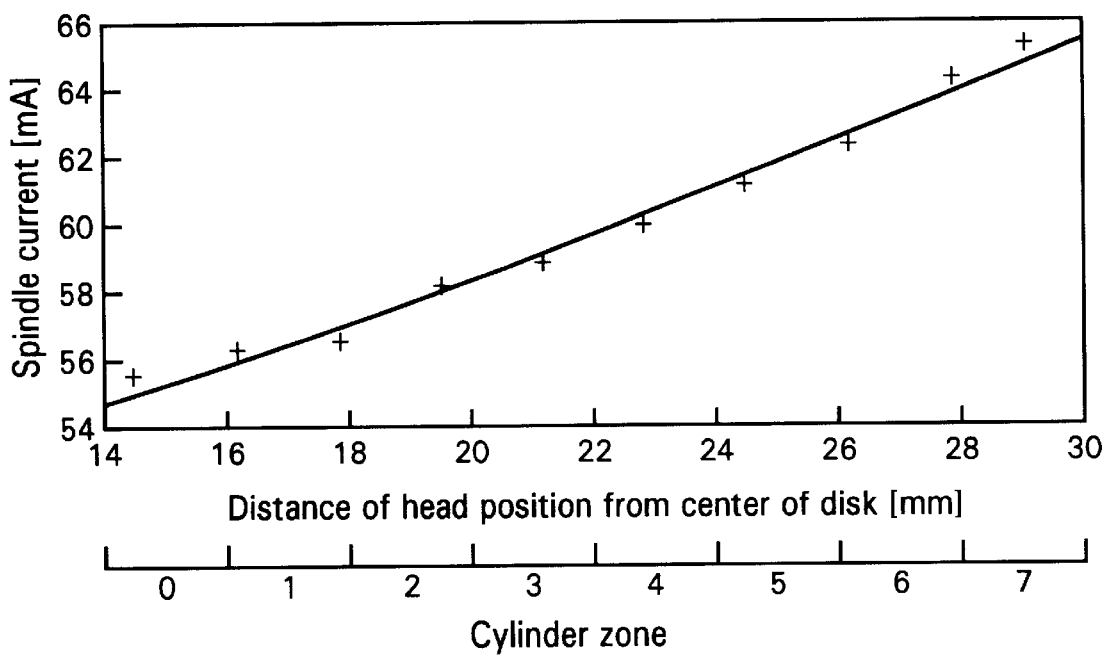
FIG. 3 is a graph showing a spindle current with respect to a position of a head unit on a disk when the disk is rotating at a constant speed.

FIG. 3 is a graph showing the spindle current $I_{spn}$ with respect to the position of the head unit 3 on the disk 1 when the disk 1 is rotating at a constant speed. In FIG. 3, the horizontal axis represents the distance of the head unit 3 position from the center of the disk (radius). Areas on the disk 1 for which the distance from the center of the disk is 14 to 16 mm, 16 to 18 mm, . . . , 28 to 30 mm, correspond to cylinder zones 0 to 7, respectively (see FIG. 2).

The value of the spindle current $I_{spn}$ for rotating the disk 1 at a constant speed varies according to the position of the head unit 3, as shown in FIG. 3, with the above described spindle current value increasing the further toward the outer edge of the disk 1 the head unit 3 is positioned. This variation in the spindle current value according to the head position derives from that fact that the drag force exerted on the disk 1 by the slider of the head unit 3 increases toward the outer edge of the disk 1.

The above described drag force is a kind of air resistance or friction resistance received by the disk 1 from the slider, due to the fact that buoyancy is received from the rotating disk 1 and the slider of the head unit 3 flies close to the surface of the disk. The spindle current value increases as the drag force increases, the drag force increases as the travel speed of the cylinder at which the head unit 3 is positioned increases, and the travel speed increases the further a cylinder is toward the outer edge of the disk.

Figure 4:
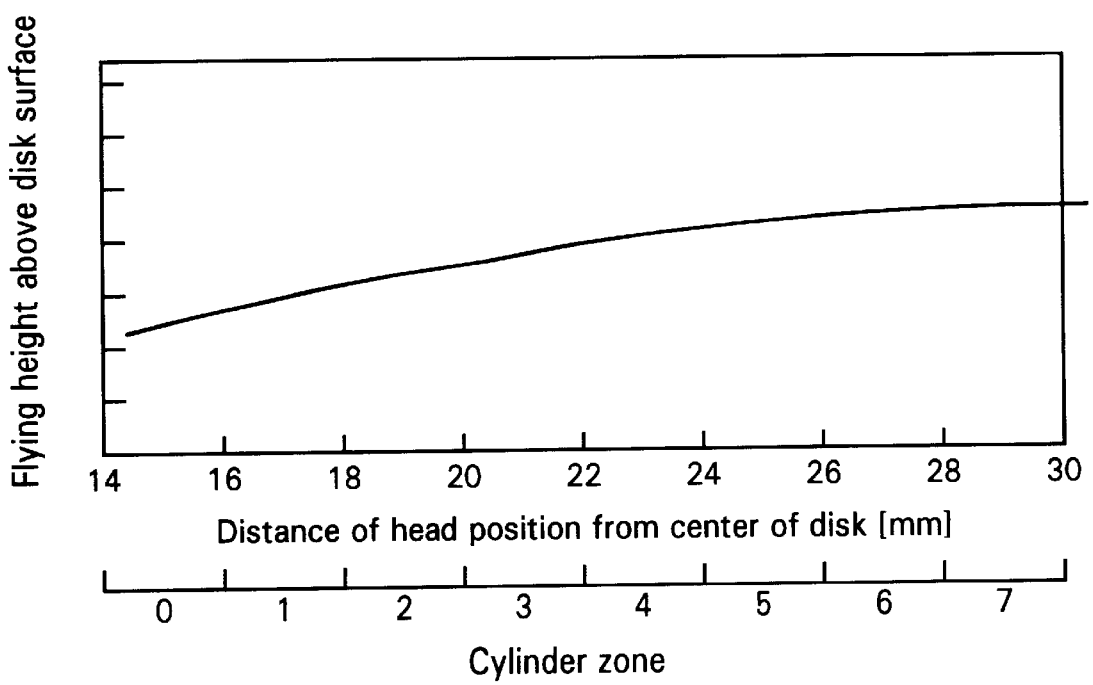
FIG. 4 is a graph showing a height above a surface of the disk at which the head unit flies, with respect to a position of the head unit, when the disk is rotating at a constant speed.

Furthermore, FIG. 4 is a graph showing the height above the surface of the disk 1 at which the head unit 3 flies, with respect to the position of the head unit 3, when the disk 1 is rotating at a constant speed. In FIG. 4, the horizontal axis represents the distance of the head unit 3 position from the center of the disk (radius). Areas on the disk 1 for which the distance from the center of the disk is 14 to 16 mm, 16 to 18 mm, ..., 28 to 30 mm, correspond to cylinder zones 0 to 7, respectively (see FIG. 2).

The flying height of the head unit 3 when the disk 1 is rotating at a constant speed varies according to the position of the head unit 3, as shown in FIG. 4, with the buoyancy received from the disk 1 by the slider of the head unit 3 increasing, and the head unit 3 flying at a greater height, the further toward the outer edge of the disk 1 the head unit 3 is positioned. That is to say, the flying capability of the head unit 3 can be increased the further toward the outer edge of the disk 1 it is positioned, and the flying capability of the head unit 3 decreases the further toward the center of the disk it is positioned.

Even if position detection data cannot be obtained by means of servo information, the position of the head unit 3 can be recognized, and the position of the head unit 3 can be controlled, on the basis of the spindle current $I_{spn}$ for rotating the disk 1 at a constant speed. When the head position is recognize, and the head unit 3 is controlled at the target position, on the basis of position detection data, it is possible to recognize accurately whereabouts within which cylinder the head unit 3 is positioned (as it is possible to recognize accurately the distance of the head position from the center of the disk), and therefore it is possible to control the position of the head unit 3 within a narrow range, and the above described target position is set, for example, as the central position in the direction of width within a particular cylinder. The above described kind of high-precision position control is necessary when performing disk access.

In contrast to this, when the head position is recognized, and the head unit 3 is controlled at the target position, on the basis of the spindle current value, it is only possible to recognize a more approximate position than when using position detection data, and therefore control of the position of the head unit 3 is possible only within a wider range than when using position detection data, and the above described target position is set, for example, within a particular cylinder or within a particular cylinder zone. In the above described power-save mode (A) in which disk access is not performed, to ensure that the actuator 4 does not move toward the outer edge of the disk and lodge against the ramp 5, or move toward the center of the disk and lodge against the inner crash stop, it is sufficient to be able to position the head unit 3 within a prescribed cylinder zone, for example, and therefore it is quite possible to reach the target by controlling the position of the head unit 3 on the basis of the spindle current value.

In the above described power-save mode (A), it is desirable for the spindle current $I_{spn}$ to be as small as possible in order to reduce power consumption, and for this purpose it is desirable for the head unit 3 to be positioned toward the inner edge of the disk (see FIG. 3). On the other hand, it is desirable for the flying height (flying capability, and buoyancy received by the slider) of the head unit 3 to be as great as possible, and for this purpose it is desirable for the head unit 3 to be positioned toward the outer edge of the disk (see FIG. 4). Also, when a disk access command is input, it is desirable to be able to seek the cylinder to be accessed in the shortest possible time, and for this purpose it is desirable for the head unit 3 to be positioned midway between the innermost cylinder and the outermost cylinder of the disk 1. Moreover, it is also desirable for the head unit 3 to be positioned in the middle of the cylinder area to prevent the head arm 42 from moving and lodging against the ramp 5 or the crash stop.

In the above described power-save mode (A) in which the position of the head unit 3 is controlled on the basis of the spindle current $I_{spn}$, it is desirable for the target position—as a position reconciling the above described power consumption reduction, securement of flying capability, shortening of the seek time, and prevention of lodgment against the ramp 5, etc.—to be set midway between the innermost cylinder and the outermost cylinder (for example, within the cylinder zone positioned in the middle).

Figures 5A, 5B, 5C:
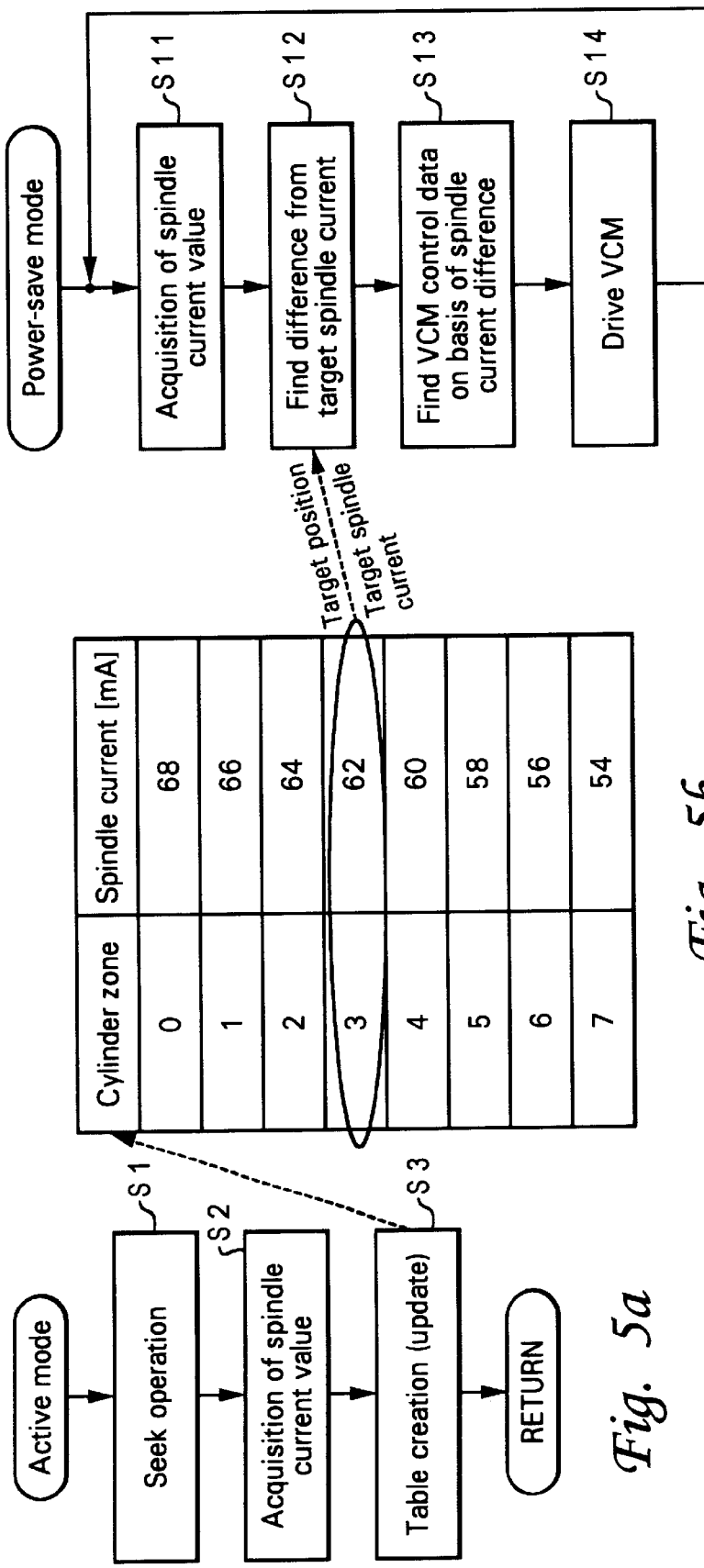
FIG. 5 is a drawing explaining a power-save mode using head position control based on the spindle current in the disk apparatus of an embodiment of the present invention.

FIG. 5 is a drawing explaining a power-save mode (above described power-save mode (A)) using head position control based on the spindle current $I_{spn}$ in the disk apparatus of an embodiment of the present invention. Here, FIG. 5A shows the procedure for spindle current table creation in the active mode, FIG. 5B shows the configuration of the spindle current table, and FIG. 5C shows the procedure for head position control based on the spindle current $I_{spn}$ in the power-save mode.

First, in the active mode, the spindle current table in FIG. 5B, listing the spindle current values for each cylinder zone, is created using the procedure comprising steps S1, S2, and S3 in FIG. 5A.

For cylinder zone 0, for example, the MPU 75, in step S1, seeks a prescribed cylinder within cylinder zone 0 by means of head position control in accordance with position detection data, and positions the head unit 3 above that cylinder; then, in step S2, reads the spindle control data $D_{spn}$ set in the register unit 66 by the ADC 63; and in step S3, writes the above described spindle control data $D_{spn}$ into the Spindle Current column slot for cylinder zone 0 in the table in FIG. 5B as the spindle current value.

As the spindle control data $D_{spn}$ (=spindle control voltage $V_{spn}$ value) has a linear relationship with the spindle current value, if the spindle control data $D_{spn}$ is known, the spindle current value is known. For the sake of simplicity, spindle current values are shown in the table in FIG. 5B, but it is also possible to write the above described spindle control data directly into the Spindle Current column, without converting it to a current value.

Following the above procedure, the spindle current values (spindle control data) when the head unit 3 is positioned in cylinder zone 0, 1, 2, ... 7 are obtained and written into the Spindle Current column slots for the respective cylinder zones in the table in FIG. 5B, to create or update the spindle current table.

An example of the creation and update timing for the above described spindle current table would be that, when the disk apparatus power supply is turned ON, steps S1 to S3 in FIG. 5A are executed for all cylinder zones, and the spindle current values for all cylinder zones are written to the table (table creation), after which, when there is a disk access for a particular cylinder zone, steps S1 to S3 in FIG. 5A are executed for that cylinder zone together with the disk access operation, and the spindle current value for that cylinder zone is updated. Alternatively, steps S1 to S3 in FIG. 5A could be executed for all cylinder zones, and the table updated, between disk access operations.

The cylinder for which the spindle current value is obtained could be, for example, the cylinder in the middle of the relevant cylinder zone. Alternatively, it would also be possible to obtain spindle current values for a plurality of cylinders within a cylinder zone, and use the average of these spindle current values as the spindle current value for that cylinder zone.

The above described spindle current table is created either in registers inside the MPU 75, or in DRAM of the memory 74. Alternatively, the table can be created in ROM of the memory 74 and retained even when the disk apparatus power supply is turned OFF, or else held in a special area of the disk 1, and loaded into DRAM of the memory 74 when the disk apparatus power supply is turned ON. If the above described table is retained in ROM of the memory 74 or in a special area of the disk 1 even when the disk apparatus power supply is turned OFF, table creation or updating need not be performed when the power supply is turned ON.

Next, in switching from the active mode to a power-save mode, the MPU 75 takes a cylinder zone around the middle of the cylinder location area of the disk 1—for example, cylinder zone 3—as the target position, and the spindle current value for cylinder zone 3 in the table in FIG. 5B (=62 mA) as the target spindle current, and with the head unit 3 having been moved to within cylinder zone 3—the target position-in the active mode, turns OFF the power supplies of the amplifier 71, decoder 72, and encoder 73, starts the control procedure in FIG. 5C, and maintains the head unit 3 within the target cylinder zone 3.

First, in step S11, the MPU 75 obtains the value of the spindle current $I_{spn}$ supplied to the spindle motor 2 by the spindle driver 62. Actually the spindle control data $D_{spn}$ set in the register unit 66 by the ADC 63 is read. The spindle control data $D_{spn}$ is the result of conversion to digital data by the ADC 63 of the spindle control voltage $V_{spn}$ output to the spindle driver 62 by the rotation speed controller 61 in order to rotate the disk 1 at a constant speed. As there is a linear relationship between the spindle control data $D_{spn}$ and the spindle current $I_{spn}$, it is also possible to use the spindle control data Dspn as the spindle current value.

Next, in step S12, the MPU 75 finds, by computation, the difference of the spindle current value obtained in the above described step S11 from the above described target spindle current value (the spindle current value for cylinder zone 3 in the table in FIG. 5B). Actually, the difference of the spindle control data obtained in the above described step S11 from the target spindle control data is found. As there is a linear relationship between the difference of the spindle control data and the difference of the spindle current value, it is also possible to use the spindle control data difference as the spindle current value difference.

Next, in step S13, the MPU 75, based on the difference of the spindle current value found in the above described step S12, refers to the table in FIG. 5B and finds, by computation, the VCM control data $D_{vcm}$ for making this difference 0. Next, in step S14, the MPU 75 sets the VCM control data $D_{vcm}$ found in the above described step 13 in the register unit 66, and drives the VCM 41 of the actuator 4 by means of the DAC 64 and VCM driver 65. The DAC 64 converts the VCM control data $D_{vcm}$ set in the register unit 66 to an analog voltage, and outputs this VCM control voltage $V_{vcm}$ to the VCM driver 65. The VCM driver 65 supplies a VCM current $I_{vcm}$ in accordance with the VCM control voltage $V_{vcm}$ to the VCM 41, and drives the VCM 41.

By repeating the position control procedure, comprising the above described steps S11 to S14, that controls the head position on the basis of the spindle current value, the head unit 3 is maintained within cylinder zone 3, the target position. When a disk access command is input, the MPU 75 turns ON the power supplies of the amplifier 71, decoder 72, and encoder 73, starts head position control based on the head unit 3 position detection data generated by the decoder 72 from servo information read from the disk 1 by means of the head unit 3, returns the disk apparatus to the active mode, and starts a seek of the cylinder to be accessed.

Thus, according to this embodiment of the present invention, by obtaining the spindle current value in a power-save mode, and, using the fact that the spindle current varies according to variations in the position of the head unit, controlling the position of the head unit on the basis of the above described spindle current value, the position of the head unit can be adjusted to a prescribed target position even though head unit position detection data cannot be obtained, and it is possible to reduce the size of a disk apparatus for enabling the head position to be controlled without using any bias force exerted by the flexible cable.

Also, in a power-save mode, it is possible to reconcile power consumption reduction, securement of flying capability, shortening of the seek time, and prevention of lodgment against the ramp, etc., by positioning the head unit midway between the innermost cylinder and the outermost cylinder.

Figure 6:
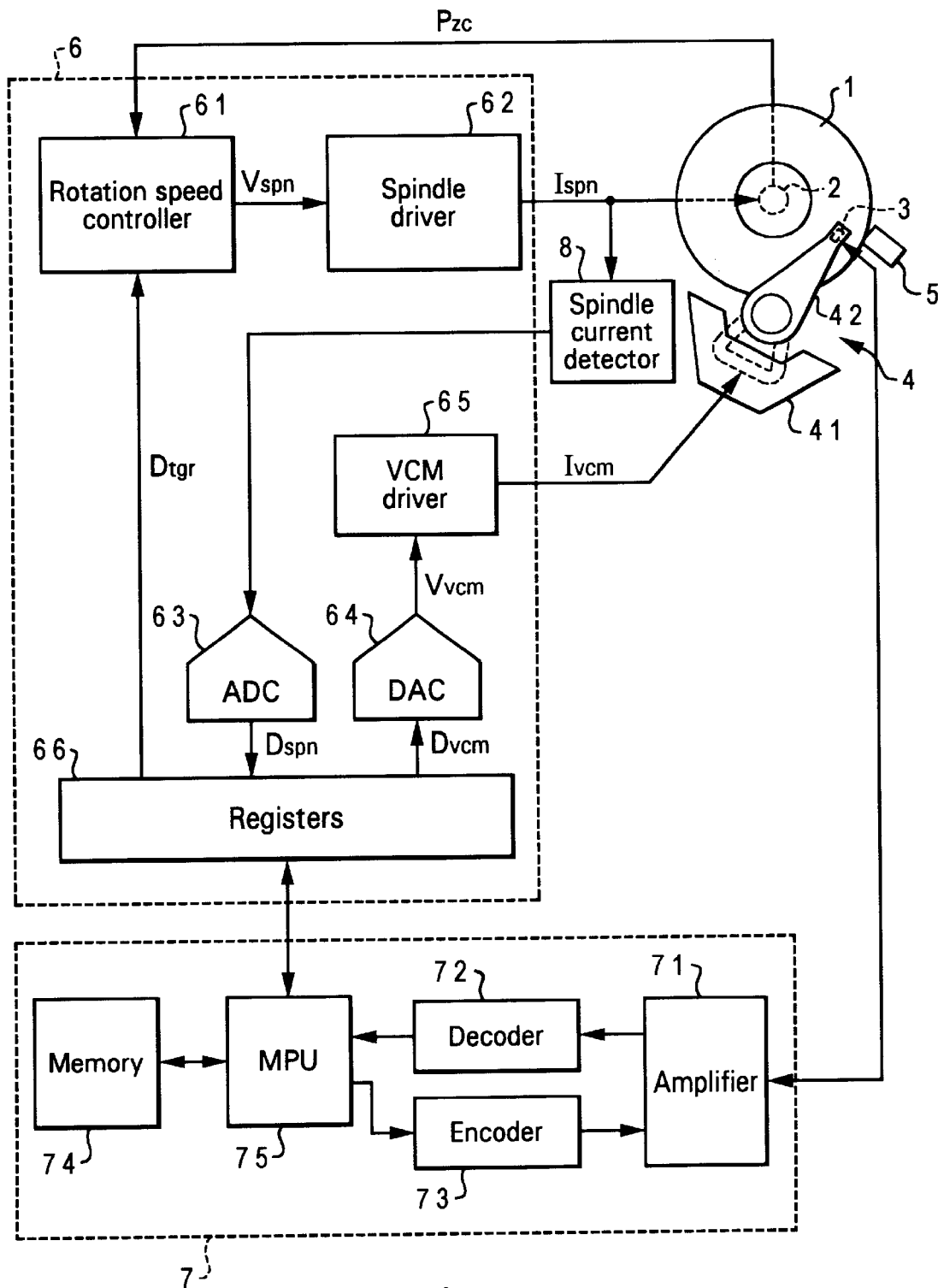
FIG. 6 is a configuration drawing of a disk apparatus according to another embodiment of the present invention.
Figure 7B:
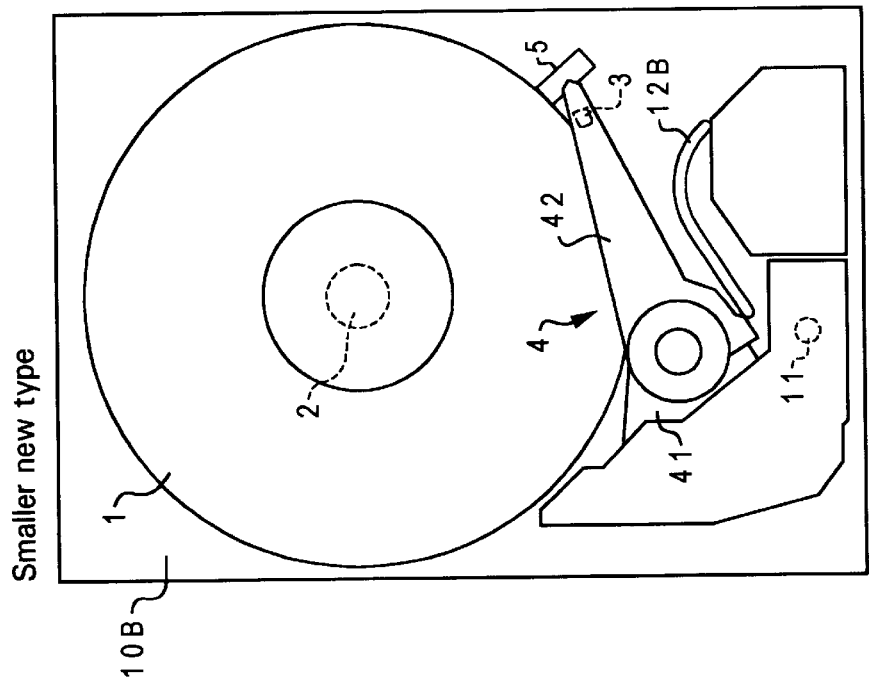
FIG. 7 shows structural drawings of interiors of enclosures of disk apparatuses for both the prior art and the present invention.
Figure 7A:
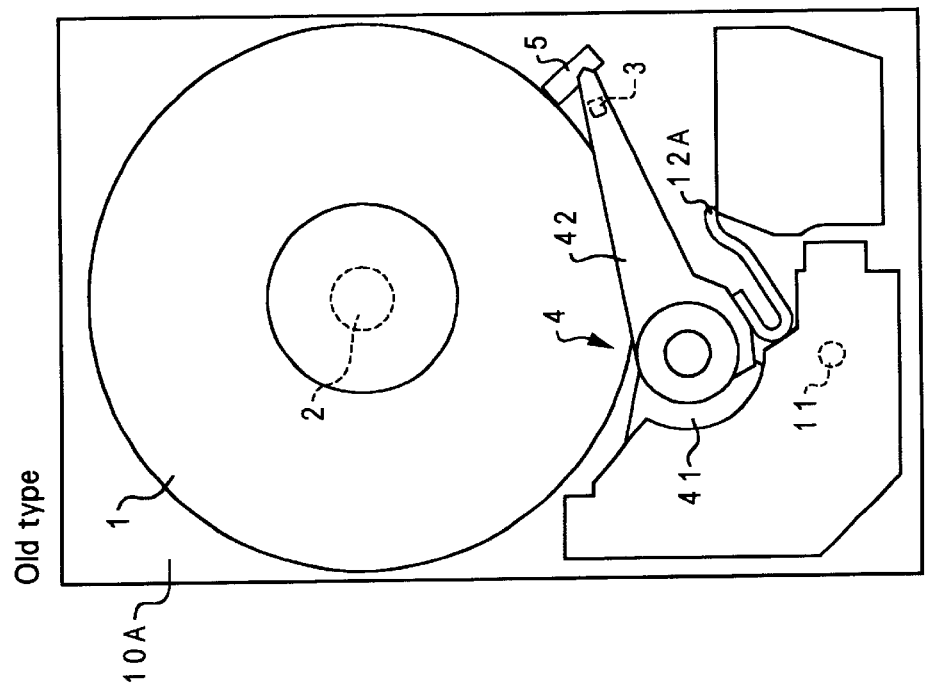
Figure 8A:
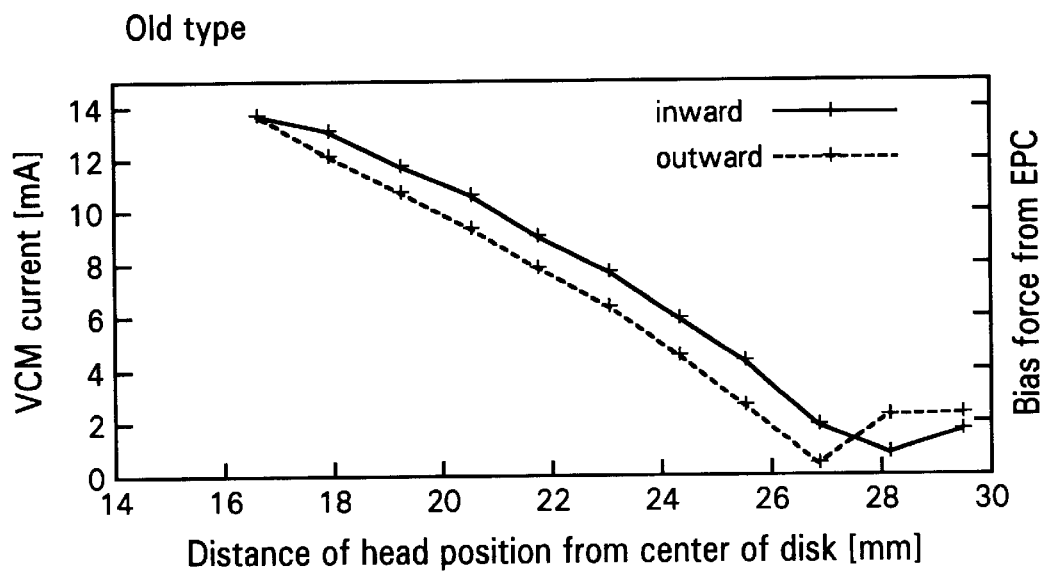
FIG. 8 presents graphs showing a bias force received by an actuator from an FPC (a VCM current that generates torque for balancing this bias force) with respect to a position of the head unit in the disk apparatuses of FIG. 7.
Figure 8B:
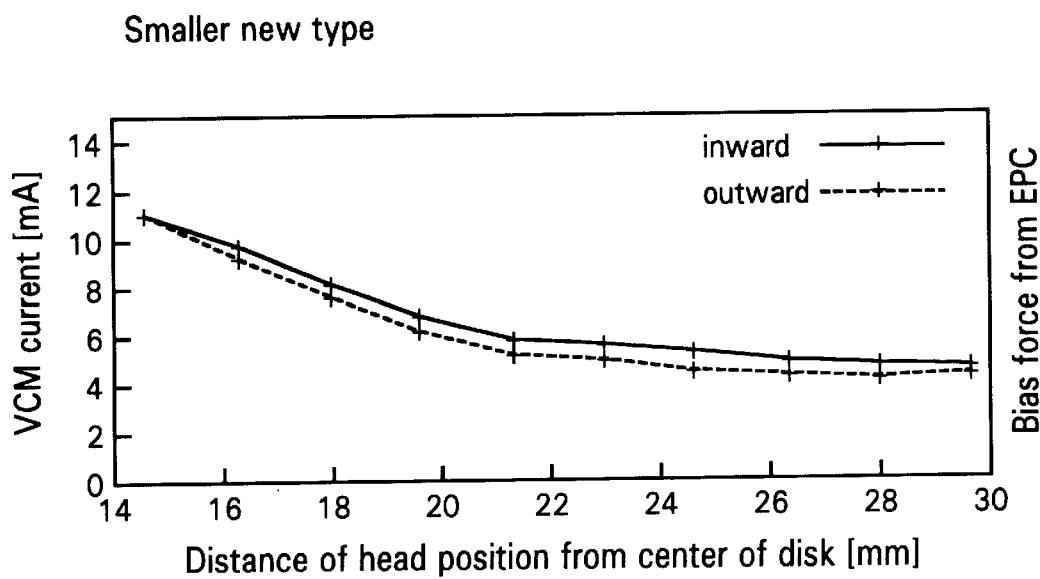

In the above described embodiment, the value of the spindle control voltage $V_{spn}$(=spindle control data $D_{spn}$) input to the spindle driver 62 is obtained as the spindle current value, but it is also possible to provide a spindle current detector 8 that directly detects the spindle current $I_{spn}$ supplied to the spindle motor 2 from the spindle driver 62, as shown in FIG. 6, and to have the spindle current detection signal output from this spindle current detector 8 converted to digital data by the ADC 63. Directly detecting the spindle current supplied to the spindle motor 2 enables the precision of head unit control to be improved.

Also, in the above described embodiment, a spindle current table (see FIG. 5B) is created for all cylinder zones in the active mode, and is referenced when finding VCM control data in the power-save modes, but it is also possible for only the power-save mode target spindle current (the cylinder zone 3 spindle current) to be obtained and held in the active mode. In this case, a table listing VCM control data set according to the difference of the spindle current from the target spindle current could be prepared beforehand, or VCM control data could be set according to the sign (plus or minus) of the spindle current difference.

The present invention has several advantages. By obtaining the spindle current value and by using the fact that the spindle current varies according to variations in the position of the head unit, controlling the position of the head unit on the basis of the above described spindle current value, advantages are provided in that the position of the head unit can be adjusted to a prescribed target position even though head unit position detection data cannot be obtained, and the disk apparatus can be made smaller.

What is claimed is:

1. A disk apparatus, comprising:
   a disk, which is a data recording medium;
   a spindle motor for rotating the disk;
   a disk rotation speed controlling means for supplying a spindle current to the spindle motor to rotate the disk at a constant speed;
   a head unit for accessing the disk;
   an actuator for moving the head unit; and
   a head position controlling means for driving the actuator and controlling the position of the head unit,
   wherein the head position controlling means obtains the value of the spindle current and controls the position of the head unit on the basis of the spindle current value by using the fact that the spindle current varies according to variations in the position of the head unit and a position detection data generating means for generating position detection data for the head unit from servo information that the head unit reads from the disk; and wherein the head position controlling means controls the position of the head unit on the basis of the position detection data when the power supply of the position detection data generating means is on, and controls the position of the head unit on the basis of the spindle current value when the power supply of the position detection data generating means is off.

2. The disk apparatus according to claim 1, wherein the head position controlling means obtains the spindle current value when the head unit is positioned at a target position as a target position value, and holds it in advance when the power supply of the position detection data generating means is on, and positions the head unit above the target position on the disk by driving the actuator so that the spindle current value becomes the target current value when the power supply of the position detection data generating means is off.

3. The disk apparatus according to claim 2, wherein the target position is an intermediate position between the innermost cylinder and the outermost cylinder.

4. The disk apparatus according to claim 2, wherein the head position controlling means turns off the power supply of the position detection data generating means when the head unit has been positioned at the target position by control of the head position on the basis of the position detection data, and starts control of the head position on the basis of the spindle current value.

5. The disk apparatus according to claim 1, wherein the head position controlling means obtains the respective values of the spindle current value when the head unit is positioned on the basis of the position detection data in each of a plurality of cylinder zones of the disk, and holds these as a table when the power supply of the position detection data generating means is on, and controls the position of the head unit on the basis of the table and the obtained spindle current value when the power supply of the position detection data generating means is off.

6. In a disk apparatus, comprising:

a disk, which is a data recording medium;

a spindle motor for rotating the disk;

a disk rotation speed controlling means for supplying a spindle current to the spindle motor to rotate the disk at a constant speed;

a head unit for accessing the disk; and an actuator for moving the head unit, a head position control method for controlling the position of the head unit by using the fact that the value of the spindle current varies according to variations in the position of the head unit, comprising the steps of:

obtaining the value of the spindle current;

finding the difference of the spindle current value from the target current value; and driving the actuator according to the difference; and wherein the disk apparatus further comprises:

position detection data generating means for generating position detection data for the head unit from servo information that the head unit reads from the disk, and the position of the head unit is controlled on the basis of the position detection data when the power supply of the position detection data generating means is on; and the position of the head unit is controlled by means of the above steps when the power supply of the position detection data generating means is off.

* * * * *